United States Patent
Crenella et al.

(10) Patent No.: US 6,956,463 B2
(45) Date of Patent: Oct. 18, 2005

(54) METHOD AND APPARATUS FOR PROVIDING BOTH POWER AND COMMUNICATION OVER TWO WIRES BETWEEN MULTIPLE LOW VOLTAGE AC DEVICES

(75) Inventors: David Crenella, Berlin, CT (US); Michael Steel Smyth, Andrews, IN (US)

(73) Assignee: Carrier Corporation, Farmington, CT (US)

( * ) Notice: Subject to any disclaimer, the term of this patent is extended or adjusted under 35 U.S.C. 154(b) by 567 days.

(21) Appl. No.: 10/263,009

(22) Filed: Oct. 2, 2002

(65) Prior Publication Data

US 2004/0066245 A1 Apr. 8, 2004

(51) Int. Cl.[7] ............................................. H04M 11/04
(52) U.S. Cl. ..................... 340/310.01; 340/310.02; 340/693.1; 340/333; 700/3
(58) Field of Search ................ 340/310.01–310.08, 340/333, 693.1, 693.4; 333/1, 24 R; 700/3; 375/257, 259

(56) References Cited

U.S. PATENT DOCUMENTS

| | | | | |
|---|---|---|---|---|
| 4,086,569 A | * | 4/1978 | Pitches et al. | 340/825.26 |
| 4,328,482 A | * | 5/1982 | Belcher et al. | 340/310.02 |
| 4,408,185 A | * | 10/1983 | Rasmussen | 340/310.02 |
| 5,614,811 A | * | 3/1997 | Sagalovich et al. | 323/207 |
| 5,694,109 A | * | 12/1997 | Nguyen et al. | 340/310.02 |
| 5,742,225 A | * | 4/1998 | Wetzel et al. | 340/310.02 |
| 5,920,253 A | * | 7/1999 | Laine | 340/310.01 |
| 6,097,761 A | * | 8/2000 | Buhring et al. | 375/257 |
| 6,320,494 B1 | * | 11/2001 | Bartels et al. | 340/310.01 |

* cited by examiner

Primary Examiner—Donnie L. Crosland
(74) Attorney, Agent, or Firm—Wall Marjama & Bilinski LLP

(57) ABSTRACT

A system master unit is connected to a 24V AC power source. One or more slave units is connected to the master unit by a power/communication line. Bulk capacitance in the master and slave units stores power during a power source positive half cycle. When the source voltage is higher than the bulk capacitance voltages, power is delivered to the loads, during which time communication cannot take place over the power/communication line. During the power source negative half cycle, the power/communication line is disconnected from the AC power source and is then used for communication between the master and slave units. System power is delivered from the energy stored in the bulk capacitance.

7 Claims, 3 Drawing Sheets

METHOD AND APPARATUS FOR PROVIDING BOTH POWER AND COMMUNICATION OVER TWO WIRES BETWEEN MULTIPLE LOW VOLTAGE AC DEVICES

FIELD OF THE INVENTION

This invention relates generally to the field of power line communications, and more particularly to providing both power and communications over low voltage power lines.

BACKGROUND OF THE INVENTION

Heating Ventilation and Air Conditioning (HVAC) systems typically operate on 24V AC that is derived from a transformer connected to the AC power line of the home. This single source must provide power for all the components within the HVAC system. In newer systems, power is typically delivered via one pair of wires, while one or more additional wires are used to provide communication. System installation can become a serious issue if the existing house wiring does not support the wiring required for the desired features. It is therefore desirable to have a system that needs only 2 wires to provide both power and communication. This would allow for system component installation unconstrained by the amount of existing wiring.

Two wire solutions currently exist for providing power and communications. However, these power line carrier (PLC) solutions are geared toward communication over the AC power lines within a home where the loads need uninterrupted full cycle AC power. This requirement drives the nature of PLC devices. PLC devices typically communicate by inducing a high frequency voltage or current onto the AC power line and are relatively expensive.

SUMMARY OF THE INVENTION

Briefly stated, a system master unit is connected to a 24V AC power source. One or more slave units is connected to the master unit by a power/communication line. Bulk capacitance in the master and slave units stores power during a power source positive half cycle. When the source voltage is higher than the bulk capacitance voltages, power is delivered to the loads, during which time communication cannot take place over the power/communication line. During the power source negative half cycle, the power/communication line is disconnected from the AC power source and is then used for communication between the master and slave units. System power is delivered from the energy stored in the bulk capacitance.

According to an embodiment of the invention, a system for providing power and communication between a plurality of low voltage devices includes a master unit connected to a 24V AC power source; at least one slave unit connected to the master unit by a power/communication line, wherein the power/communication line is a two-wire buss consisting of a power/communication wire and a common wire; capacitance means in the master and slave units for storing power during a power source half cycle of a first polarity; disconnecting means for disconnecting the AC power source from the power/communication wire during a power source half cycle of a second polarity; wherein power is delivered to the system during the power source half cycle of the second polarity from the energy stored in the capacitance means; and communication means for communicating between the master and slave units during the power source half cycle of the second polarity.

According to an embodiment of the invention, a method for providing power and communication between a plurality of low voltage devices in a low voltage system includes the steps of (a) connecting a master unit to a 24V AC power source; (b) connecting at least one slave unit to the master unit by a power/communication line, wherein the power/communication line is a two-wire buss consisting of a power/communication wire and a common wire; (c) storing power in the master and slave units during a power source half cycle of a first polarity; (d) disconnecting the AC power source from the power/communication wire during a power source half cycle of a second polarity; (e) delivering power to the system during the power source half cycle of the second polarity from the energy stored in the capacitance means; and (f) communicating between the master and slave units during the power source half cycle of the second polarity.

According to an embodiment of the invention, a system for providing power and communication between a plurality of low voltage devices includes a master unit connected to a 24V AC power source; at least one slave unit connected to the master unit by a power/communication line, wherein the power/communication line is a two-wire buss consisting of a power/communication wire and a common wire; a capacitance in each of the master and slave units for storing power during a power source half cycle of a first polarity; a diode in series between the AC power source which disconnects the AC power source from the power/communication wire during a power source half cycle of a second polarity; wherein power is delivered to the system during the power source half cycle of the second polarity from the energy stored in the capacitance; and a communication circuit for communicating between the master and slave units during the power source half cycle of the second polarity.

DETAILED DESCRIPTION OF THE PREFERRED EMBODIMENT

Figure 1:
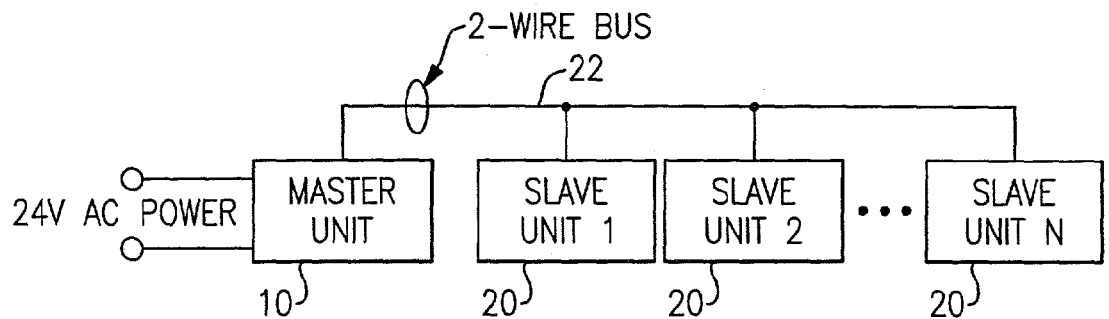
FIG. 1 shows a master unit connected to one or more slave units.

Referring to FIG. 1, a master unit 10 is connected to one or more slave units 20. The system master unit 10 is connected to a 24V AC power source. All slave units 20 are connected to the master unit 10 via a 2-wire buss 22 and receive half-wave rectified AC power over these two wires. These two wires also allow two-way communication between all components connected to the buss. Buss 22 includes a power/communication wire 22a and a common wire 22b.

As will be explained below, the configuration of master unit 10 and slave units 20 allow power/communication wire 22a to be naturally commutated to allow energy transfer during the positive half-line cycle and communication during most of the negative half cycle. The communication time could be increased by commutating the power/communication wire 22a using an active circuit.

The idea behind this invention is that the portion of the line cycle during which power is not being delivered to slave units 20 is used for communication, while the system configuration allows natural commutation of the line between power transfer and communication.

Figure 2:
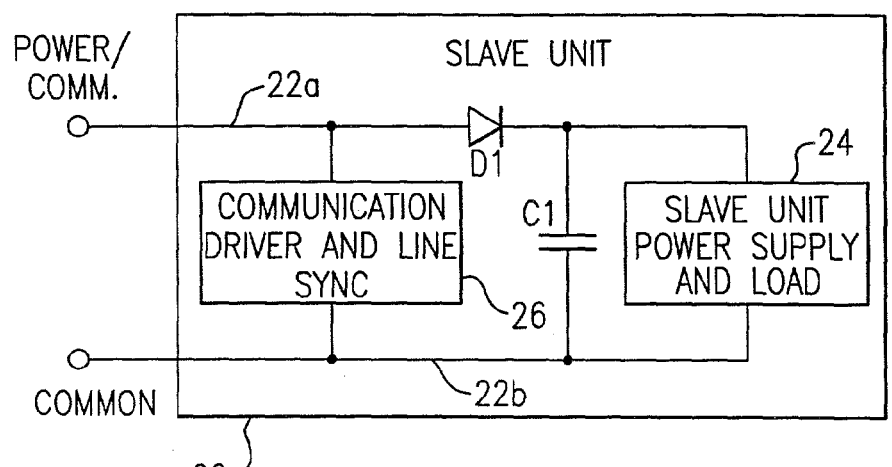
FIG. 2 shows a block diagram of the slave unit.

Referring to FIG. 2, a block diagram of slave unit 20 is shown. Each slave unit 20 contains its own power supply 24 and a communication/synchronization circuit 26 used to communicate with other units on buss 22. A diode D1 disconnects power supply 24 from power/communication line 22a during the negative half cycle of the AC power input. Each slave unit 20 receives half-wave rectified AC power via its two buss terminals during the positive half line cycle. A capacitor C1 provides energy storage during the negative half cycle. A power supply 24 for slave unit 20 can be any type of DC power supply compatible with half-wave rectified AC input voltage. A communication and line sync circuit 26 preferably includes a transmitter capable of placing a high (~11V) or low (~1V) voltage on communication line 22a, a receiver for detecting high and low states of communication line 22a, and a line sync circuit that can provide a logic level based on the AC voltage of the source. The exact nature of this circuit is not critical, but the transmitter output levels must be between ~−0.7V and ~18V to allow natural commutation to occur.

Figure 3:
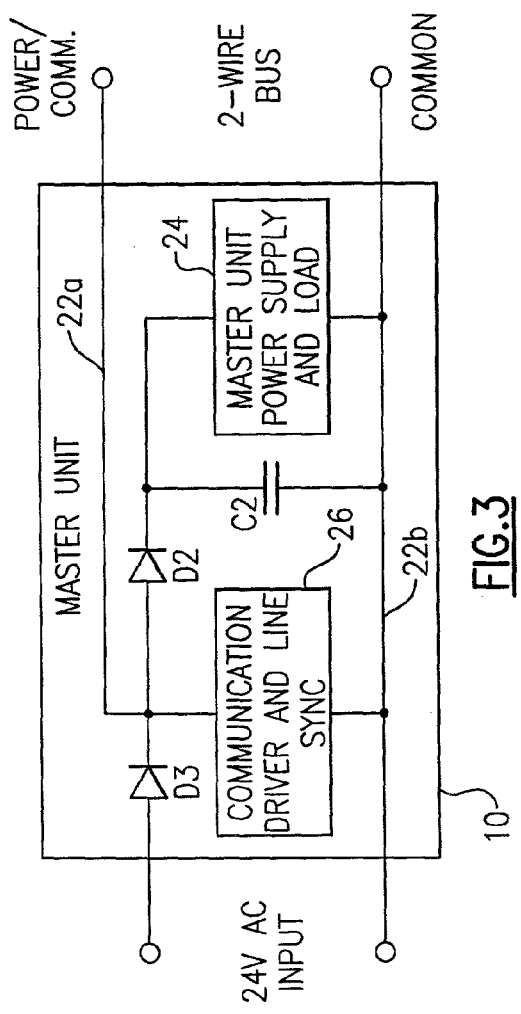
FIG. 3 shows a block diagram of the master unit.

Referring to FIG. 3, a block diagram of master unit 10 is shown. Master unit 10 includes a diode D2 and capacitor C2 for the same purposes as diode D1 and capacitor C1 serve in slave unit 20. The source AC voltage is applied to master unit 10 where it is half wave rectified by a diode D3. The rectified voltage is then applied to 2-wire buss 22 to provide power to all modules on the network.

Figure 4:
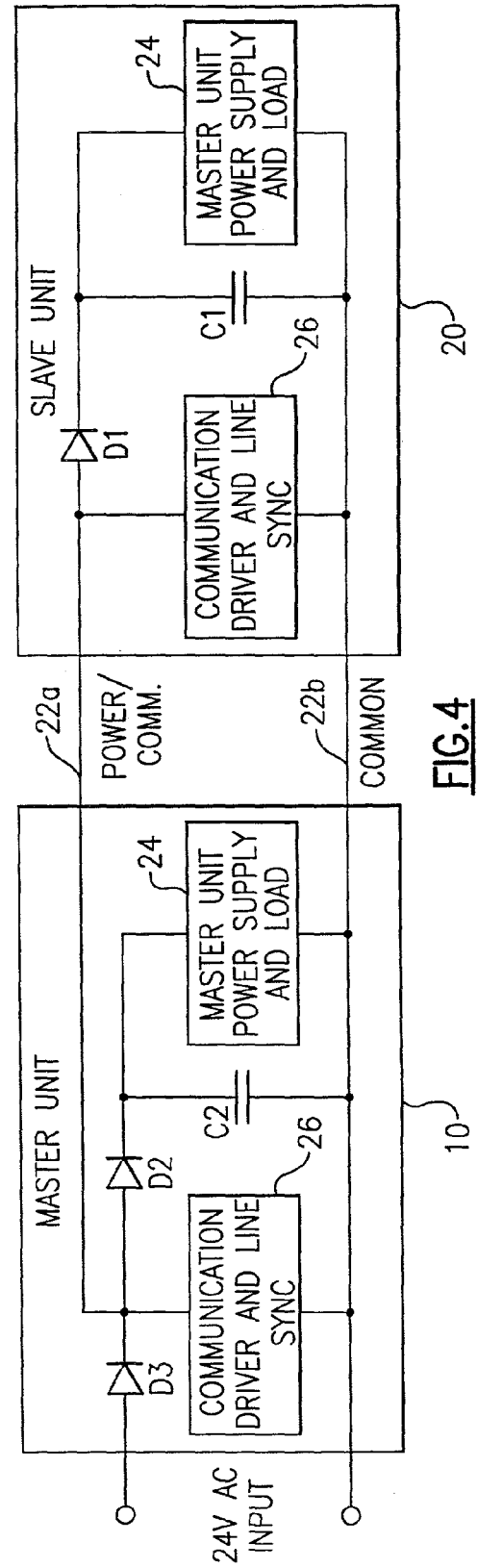
FIG. 4 shows a block diagram of the master unit connected to one slave unit.

Referring to FIG. 4, a block diagram of master unit 10 connected to slave unit 20 is shown. The configuration of diodes D1, D2, and D3, and capacitors C1 and C2 allow the power/communication wire (buss 22) to be naturally commutated to allow energy transfer during the positive half-line cycle and communication during most of the negative half cycle.

Figure 5:
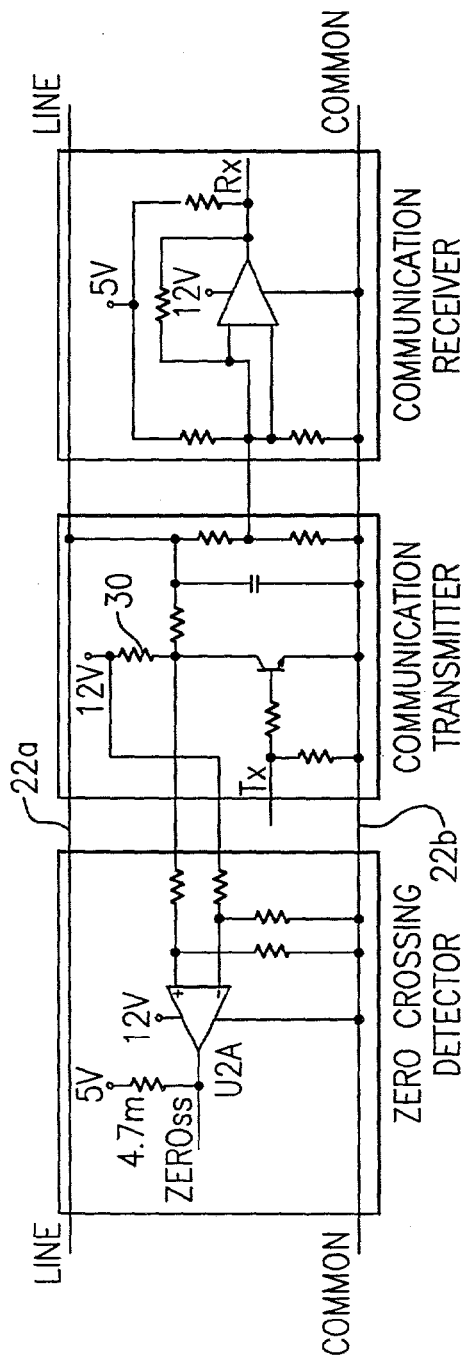
FIG. 5 shows a schematic of a communication driver and line synchronization circuit according to an embodiment of the invention.
Figure 6:
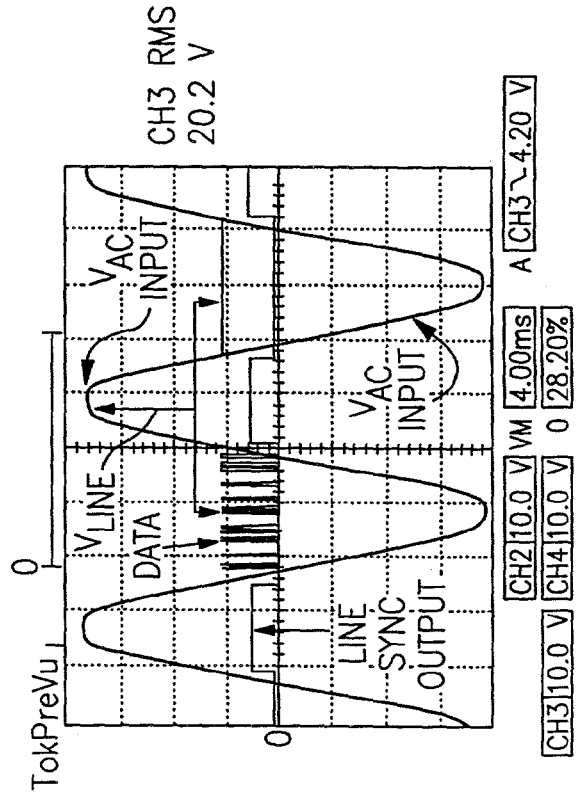
FIG. 6 shows a power source voltage waveform and communication data transmitted during a negative half cycle of the power source.

Referring also to FIG. 5, an example of communication/synchronization circuit 26 is shown. In normal operation, the master and slave unit bulk capacitance, C1 and C2, is charged to around 35V. The communication line 22 is pulled to the logic high voltage level used for communication through a 1K resistor 30. As shown in FIG. 6, the logic high voltage level is about 11V. When the source voltage is higher than the bulk capacitance voltages, power is delivered to the loads, during which time communication cannot take place. During the negative half of the power line cycle, diode D3 is reverse biased, blocking the source voltage from the system. Because line 22 is pulled to 11V and the voltages on C1 and C2 are about 35V, diodes D1 and D2 are reverse biased as well. When diodes D1 and D2 are off, line 22a is effectively disconnected from the power supplies 24 of the master unit 10 and slave units 20. During this time, line 22a is free for communication between units 10, 20 and the system is powered by the energy stored in capacitors C1 and C2. Communication timing is based on the line sync output from the communication circuitry of FIG. 5.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A system for providing power and communication between a plurality of low voltage devices, comprising:
   a master unit connected to a 24V AC power source;
   at least one slave unit connected to said master unit by a power/communication line, wherein said power/communication line is a two-wire buss consisting of a power/communication wire and a common wire;
   capacitance means in said master and slave units for storing power during a power source half cycle of a first polarity;
   disconnecting means for disconnecting said AC power source from said power/communication wire during a power source half cycle of a second polarity;
   wherein power is delivered to said system during said power source half cycle of said second polarity from said energy stored in said capacitance means; and
   communication means for communicating between said master and slave units during said power source half cycle of said second polarity.

2. A system according to claim 1, wherein said disconnecting means includes a diode connected in said power/communication wire between said communication means in said master unit and said AC power source.

3. A system according to claim 1, wherein said communication means includes a communication driver and line synchronization circuit in each of said master and slave units.

4. A system according to claim 3, wherein said capacitance means includes a capacitance connected in parallel with said communication driver and line synchronization circuit in each of said master and slave units.

5. A system according to claim 1, wherein said first polarity is positive and said second polarity is negative.

6. A method for providing power and communication between a plurality of low voltage devices in a low voltage system, comprising the steps of:
   connecting a master unit to a 24V AC power source;
   connecting at least one slave unit to said master unit by a power/communication line, wherein said power/communication line is a two-wire buss consisting of a power/communication wire and a common wire;
   storing power in said master and slave units during a power source half cycle of a first polarity;
   disconnecting said AC power source from said power/communication wire during a power source half cycle of a second polarity;
   delivering power to said system during said power source half cycle of said second polarity from said energy stored in said capacitance means; and
   communicating between said master and slave units during said power source half cycle of said second polarity.

7. A system for providing power and communication between a plurality of low voltage devices, comprising:
   a master unit connected to a 24V AC power source;
   at least one slave unit connected to said master unit by a power/communication line, wherein said power/communication line is a two-wire buss consisting of a power/communication wire and a common wire;
   a capacitance in each of said master and slave units for storing power during a power source half cycle of a first polarity;
   a diode in series between said AC power source which disconnects said AC power source from said power/communication wire during a power source half cycle of a second polarity;
   wherein power is delivered to said system during said power source half cycle of said second polarity from said energy stored in said capacitance; and
   a communication circuit for communicating between said master and slave units during said power source half cycle of said second polarity.

* * * * *